United States Patent
Hancock et al.

(10) Patent No.: US 11,037,079 B2
(45) Date of Patent: Jun. 15, 2021

(54) SYSTEM AND METHOD FOR PROVIDING OPTIMIZED MATCHING BETWEEN PROJECTS AND INDIVIDUALS HAVING APPLICABLE COMPETENCIES

(71) Applicant: 4D Technologies, LLC, Bedford, NH (US)

(72) Inventors: James Hancock, West Chesterfield, NH (US); Jared Germano, Nashua, NH (US); David Micciche, Manchester, NH (US); Matthew Murphy, New Durham, NH (US); Daniel Dolan, Bedford, NH (US)

(73) Assignee: 4D Technologies, LLC, Bedford, NH (US)

( * ) Notice: Subject to any disclaimer, the term of this patent is extended or adjusted under 35 U.S.C. 154(b) by 208 days.

(21) Appl. No.: 16/117,135

(22) Filed: Aug. 30, 2018

(65) Prior Publication Data
US 2019/0066030 A1   Feb. 28, 2019

Related U.S. Application Data

(63) Continuation of application No. 16/117,078, filed on Aug. 30, 2018.

(60) Provisional application No. 62/551,912, filed on Aug. 30, 2017, provisional application No. 62/551,919, filed on Aug. 30, 2017, provisional application No. 62/551,929, filed on Aug. 30, 2017.

(51) Int. Cl.
*G06Q 10/06*     (2012.01)
*G06N 5/04*      (2006.01)
*G06Q 50/20*     (2012.01)

(52) U.S. Cl.
CPC ....... *G06Q 10/063118* (2013.01); *G06N 5/04* (2013.01); *G06Q 10/063112* (2013.01); *G06Q 50/2057* (2013.01); *G06Q 10/06313* (2013.01)

(58) Field of Classification Search
CPC ............. G06N 5/04; G06Q 10/063112; G06Q 10/063118; G06Q 10/06313; G06Q 50/2057
USPC ...................................................... 705/7.14
See application file for complete search history.

(56) References Cited

U.S. PATENT DOCUMENTS

| | | | | |
|---|---|---|---|---|
| 8,335,705 | B2 * | 12/2012 | Ehrler | G06Q 10/063118 705/7.15 |
| 2007/0202475 | A1 * | 8/2007 | Habichler | G09B 7/00 434/219 |
| 2009/0307064 | A1 * | 12/2009 | Allpress | G06Q 10/06398 705/7.14 |

(Continued)

*Primary Examiner* — Folashade Anderson
(74) *Attorney, Agent, or Firm* — Ascentage Patent Law, LLC; Travis Lee Johnson (57) ABSTRACT

A project analysis, and match recommendation system having a user interface configured to receive user input regarding a project and associated parameters. The system also includes one or more processors configured to implement one or more sets of computer instructions which instruct the one or more processors to analyze a worker skill database having a plurality of worker profiles and associated worker skill proficiencies associated with one or more particular worker proficiencies; and determine a match between a plurality of particular required project competencies and one or more worker profiles having one or more particular worker proficiencies so as to facilitate optimal project assignment or placement.

10 Claims, 4 Drawing Sheets

(56) References Cited

U.S. PATENT DOCUMENTS

| | | | | |
|---|---|---|---|---|
| 2012/0226617 A1* | 9/2012 | Kay | ............... | G06Q 10/105 |
| | | | | 705/301 |
| 2014/0122143 A1* | 5/2014 | Fletcher | ............ | G06Q 10/0631 |
| | | | | 705/7.14 |
| 2014/0156681 A1* | 6/2014 | Lee | ............... | G06F 16/9535 |
| | | | | 707/754 |
| 2016/0026963 A1* | 1/2016 | Rathod | ......... | G06Q 10/063112 |
| | | | | 705/7.14 |
| 2016/0104096 A1* | 4/2016 | Ovick | ........... | G06Q 10/063112 |
| | | | | 705/7.14 |
| 2016/0104260 A1* | 4/2016 | Menrad | ............ | G06Q 50/2057 |
| | | | | 705/328 |
| 2017/0357943 A1* | 12/2017 | Tiner | ............... | G06Q 10/1053 |
| 2017/0357945 A1* | 12/2017 | Ashkenazi | ........ | G06Q 10/0631 |
| 2020/0394592 A1* | 12/2020 | Shi | ................. | G06N 20/00 |

\* cited by examiner

SYSTEM AND METHOD FOR PROVIDING OPTIMIZED MATCHING BETWEEN PROJECTS AND INDIVIDUALS HAVING APPLICABLE COMPETENCIES

PRIORITY CLAIM

This patent application claims priority to U.S. Provisional Application No. 62/551,912 which was filed on Aug. 30, 2017; U.S. Provisional Application 62/551,919 which was filed on Aug. 30, 2017; U.S. Provisional Application 62/551,929 which was filed on Aug. 30, 2017; and Non-Provisional application Ser. No. 16/117,078 which was filed on Aug. 30, 2018 are all hereby incorporated by reference in their entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

1. Field of the Invention

The disclosure relates to methods and systems for assigning projects to employees, particularly with respect to complex design and design or modeling software based on demonstrated proficiency of particular software users and matching projects to those user's being most proficient in the competencies needed for a particular project.

2. Description of the Prior Art

In the workplace, and particularly in the engineering design, drafting, and modeling industry, new design projects are typically received by sales representatives and transferred to individual design units which specialize in the type of design or type of product being designed. Individual software users are then assigned to complete the design task, which is typically based on that individual's docket. Any particular knowledge of a particular user's expertise is typically only considered as part of a supervisor's or assigning person's individual knowledge regarding various employee skillsets. This often leads to assignment of projects based on personal preference of the assigning person, and is often overshadowed by the particular user's docket demands and which user can start working soonest rather than assigning a project to a particular user who will be most efficient in completing the particular tasks.

BRIEF DESCRIPTION OF THE INVENTION

Disclosed herein is a project analysis and recommendation system configured to aid in the assignment of projects to particular individuals within an organization. The system is configured to track various metrics of various workers within the organization, associate those metrics to particular skillsets or competencies and determine matches of those skillsets or competencies with various jobs or projects and the identified competencies required for completing those jobs.

In particular, the system can include a user interface configured to receive user input regarding one or more project parameters, the one or more project parameters including information regarding one or more necessary competencies for project completion. The system can also include a non-transitory computer-readable medium containing one or more sets of computer instructions and a processor configured to implement the one or more sets of computer instructions. The non-transitory computer-readable medium can also include a worker profile database having a plurality of worker profiles, wherein each profile contains information regarding tracked worker skill proficiencies associated with one or more particular worker proficiencies.

The system can then be configured to instruct the processor to perform the following tasks: analyze a worker profile database and determine a probability match between the plurality of necessary competencies for project completion and one or more worker profiles having tracked worker skill proficiencies associated with the plurality of necessary competencies for project completion.

In some embodiments the system can also determine or be provided with information regarding one or more tools which will be utilized by the worker in order to complete the project.

In yet additional embodiments the computer instructions can further include instructions to track one or more assessments completed by a plurality of particular workers, each assessment being associated with a particular tool; and update each particular worker's profile and particular worker skill proficiency information based on the worker's tracked assessments associated with each tool.

In yet additional embodiments the computer instructions can further include instructions to track one or more particular worker's training history data associated with each tool; and update each worker's profile and particular user skill proficiency information based on the user's tracked training history data associated with each tool.

In yet additional embodiments the computer instructions can further include instructions to track a plurality of actions associated with one or more tools used to complete one or more workflows; and update each worker's profile and particular worker skill proficiency information based on the worker's tracked actions associated with one or more tools used to complete one or more workflows.

In yet additional embodiments the computer instructions can further include instructions to store a proficiency assessment database, wherein the proficiency assessment database contains proficiency assessments, the proficiency assessments relating to the tracked worker skill proficiencies associated with one or more particular worker proficiencies; present one of the proficiency assessments to at least one worker; track performance data for the worker on the proficiency assessment; and update each worker's profile and particular worker skill proficiency information based on the associated worker's performance on the proficiency assessment.

In yet additional embodiments the computer instructions can further include instructions to store a training module database, wherein the training module database contains training information relating to the tracked worker skill proficiencies associated with one or more particular worker proficiencies; present one of the training modules to at least one worker; track completion of each training module; and update each worker's profile and particular worker skill proficiency information based on the completion of each training module.

In yet additional embodiments the computer instructions can further include instructions to store a historical actions workflow database, wherein the historical actions workflow database contains historical actions taken by one or more workers to complete one or more workflows, the historical actions relating to the tracked worker skill proficiencies associated with one or more particular worker proficiencies; analyze the historical actions taken by each worker; and update each worker's profile and particular worker skill proficiency information based on the analyzed historical actions.

In yet additional embodiments the computer instructions can further include instructions to generate a match score between a plurality of worker profiles and associated tracked worker skill proficiencies with a particular set of necessary competencies for project completion of a particular project; and display a listing of ranked matched worker profiles based on the match score. In some such embodiments, the match score can be generated giving a first greater weight to analyzed historical actions regarding one or more previously completed workflows, a second lesser weight to performance assessments, and a third lesser weight to completed training modules.

In yet additional embodiments the computer instructions can further include instructions to store a published works database, wherein the published works database contains information relating to one or more published works generated by one or more particular workers, wherein the one or more published works are associated with one or more tracked worker skill proficiencies; track generation of one or more published works by one or more workers; and update each worker's profile and particular worker skill proficiency information based on the generation of published works. In such embodiments the probability match of each worker can be affected by the published works from a plurality of categories, which can include peer reviewed third-party publications; non-reviewed third-party publications; and self-publications.

It will be further appreciated that the various embodiments, tasks, and features of the system are discussed for purposes of exemplary discussion wherein each of which can also be carried out manually as a method implementation. Further, any particular steps or tasks can also be combined with any other steps or tasks discussed herein as deemed appropriate.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and particular language will be used herein to describe the same. It will nevertheless be understood that no limitation of the scope of the invention is thereby intended.

DETAILED DESCRIPTION

As discussed briefly above a method and system are contemplated herein which seek to increase project efficiency as well as optimize skill usage within a company by matching particular projects having a plurality of required competencies associated therewith with particular workers or employees having demonstrated proficiencies relating to the required competency requirements so as to ensure proper assignment to the best available worker or employee. In this manner, for a given project, an organization utilizing this system can then increase turnaround speed for assignments, as well as increase deliverable quality.

For example, a particular task may require various design as well as analysis of the design. In a more detailed example, a project might include the design of an impellor for a pump, which then requires fluid dynamic analysis with certain fluid viscosities or contaminant levels. While a particular software, i.e. project tool, might be suitable for the design and associated solid modeling, an alternative software might be more suited to perform both the solid modeling and the required fluid dynamics analysis. Further, in such a situation, while a particular employee or worker might have demonstrated skills in the drafting process and may be able to draw up a suitable 3D model of the part, this particular employee may be unfamiliar with the fluid dynamic analysis, while another employee might be familiar with the fluid dynamic modeling, while a third employee might be familiar with both. As such, the system as contemplated herein can match or give a probabilistic score representing the likelihood of the particular worker's ability to perform all the tasks in a proficient manner. The system does so by maintaining and updating a worker competency database which can draw competency information from a plurality of sources. Some exemplary sources, which will be discussed in more detail below can include past projects with associated necessary competencies, training history, completed assessments, tracked actions or workflows, etc.

It will be appreciated that in some embodiments, a sales representative, supervisor, or any one of a plurality of suitable users might be best suited to provide input to the system regarding one or more project parameters into an input interface when receiving the project order or upon project review prior to assignment to a particular employee or team. Additionally, various organizations may have a plurality of varying tools at their disposal. For example, a company may only have a certain number of licenses to a particular drafting software and a certain number of licenses to an alternative software. As such, the system can then determine, or receive input, regarding the tools available or required for project completion.

As such, it has been recognized that if the system can be provided with necessary tool information, or otherwise determine the tool requirements for project completion, and then track worker proficiency with the features within the various available tools, thus allowing the system to use the tracked proficiency data of a given user or worker with regard to those tool's features in order to make a recommendation or provide a probabilistic match score between workers or users within the organization and a given project.

It should also be appreciated that the database can be connected with workers that are both internal and external to a company. One of the benefits of having a system as described herein is that it is based on objective criteria that is recorded and maintained, as opposed to self-proclaimed or self-reported skillsets or proficiencies. Another advantage of the system is the true extent of a worker's skillsets can be readily ascertainable. For example, in a self-reported scenario two workers claim to know how to use and use well Microsoft's Excel software. Whereas in practice worker 1 can successfully utilize the various regression tools, while worker 2 is proficient with creating and generating pivot tables. This example illustrates that for a given tool, and especially one that has hundreds if not thousands of functions, workers can be proficient at certain tasks, while not being able to do other tasks.

It should also be understood that a program like Microsoft's excel has the ability to perform a given task in multiple ways; however, some approaches may be more efficient or effective than others. One example of efficiency could involve inputting and sorting data. Manually entering and sorting the data is a viable option; however, taking advantage of the various input and sorting features is more effective.

Having a system and method like the one described herein, allows for a clearer understanding and depth of a worker's proficiencies and skillsets that can be authenticated as opposed to self-reported, thus providing a more objective based approach for matching workers to particular projects.

In order to achieve these functions, contemplated herein is a project analysis and recommendation system 10 and method, which can be utilized to aid in the assignment of projects to particular individuals within an organization. The method and system, as shown in FIGS. 1-5, are configured to track various competencies of various workers within a given organization, associate those metrics to particular skillsets or competencies and determine matches of those skillsets or competencies with various jobs or projects and the identified competencies required for completing those jobs. It should be noted it is possible to apply this system and method across multiple organizations.

Figure 4:
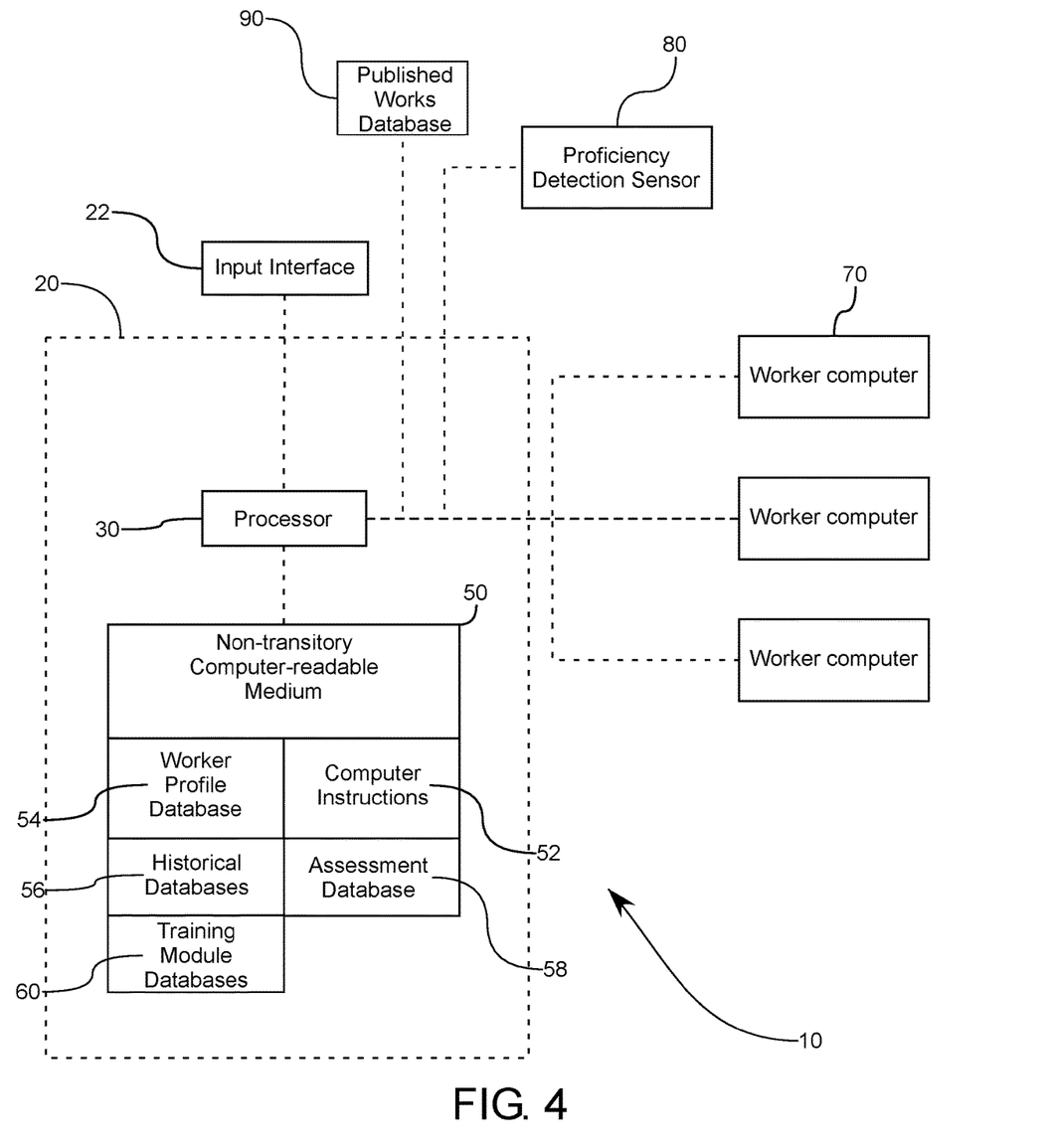
FIG. 4 illustrates an exemplary schematic of a system which can be configured to carry out the various method steps as illustrated in any of the preceding figures.

In particular, the system 10 can include a user interface 22 configured to receive user input regarding one or more project parameters, the one or more project parameters including information regarding one or more necessary competencies for project completion. The system can also include a non-transitory computer-readable medium 50 containing one or more sets of computer instructions 52 and a processor 30 configured to implement the one or more sets of computer instructions 52. The non-transitory computer-readable medium 50 can also include a worker profile database 54 which can contain a plurality of worker profiles, wherein each profile contains information regarding tracked worker skill proficiencies associated with one or more particular worker proficiencies. The processor 30 and non-transitory computer readable medium 50 can be provided on a remote server 20 where the input interface interacts through a wireless or network connection in order to receive input. However, in some instances the input interface can be integrally provided with the server 20 and input received directly and locally.

In some embodiments the system 10 can be provided with one or more historical databases which track user actions, training modules, assessments, project histories, etc. wherein the historical database can then be utilized to track user interactions, extract the competencies demonstrated through these interactions, and then update each worker's associated profile within the worker profile database to reflect an iteratively updated competency profile for each worker.

In some embodiments, the system and computer instructions can include instructions for the processor to analyze the worker profile database and determine a probability match between the plurality of necessary competencies for project completion and one or more worker profiles having tracked worker skill proficiencies associated with the plurality of necessary competencies for project completion.

In some embodiments, the system can also determine or be provided with information regarding one or more tools which will be utilized by the worker in order to complete the project. As discussed above, the one or more tools can include various software applications, but should not be limited to only computer software. For example, sensors are often utilized for tracking human behavior, and can track human motion, it is also contemplated herein that sensors can be utilized to track worker proficiency regarding various physical tasks, which physical tasks can be described by certain motions and compared to optimal motions for carrying out a particular task utilizing a particular tool having a particular feature set so as to determine a proficiency in a particular tool competency. Such motions could be as menial as proper form, body stance, and associated motions for swinging a tool such as an axe as determined by recorded optical sensor data or heat signature data. Sensors can also be integrated into equipment, such as heavy equipment, and track how the user operates the heavy equipment given their surroundings.

Tool information can include tool versions, features, etc. wherein one or more tools and one or more tool features can be required to complete a project. It will then be appreciated that the particular tool, or features within a tool, which are required for project completion can be input by a user, or such requirements can be automatically detected by tokenization and recognition of functions as extracted from a project description. Such automatic recognition can be achieved by providing a historical database of previous projects, their associated descriptions, tools used to complete the project, and actions taken by workers while working on the project. These historical databases can then be searched and compared to the current project parameters, and then matched to workers having the proficiencies matching the proficiencies displayed during the completion of previous similar projects.

In some embodiments the computer instructions can include instructions to retrieve, present, and track worker performance on one or more assessments. In such a case the assessment can have various actions associated therewith which correlate to worker proficiency upon giving correct answers, performing actions correctly, in a particular sequence etc. As such, completion by a plurality of particular workers can result in an assessment score and an associated proficiency with regard to that particular required competency from which a determination of best fit can be determined thereby. Further, each assessment can be associated with a particular tool and features thereof wherein the system can then update each particular worker's profile and particular worker skill proficiency information based on the worker's tracked assessments associated with each tool.

In yet additional embodiments the historical databases can include various training modules associated with one or more necessary competencies and associated worker proficiencies. In some such cases the computer instructions can then further include instructions to track one or more particular worker's training history data associated with each tool and update each worker's profile and particular worker skill proficiency information based on the worker's tracked training history data associated with each tool. In some such embodiments the historical database can include a library of available training modules etc. which the user's interactions with the training module can be tracked and receive an associated increase in demonstrated or proficiency.

In yet additional embodiments the computer instructions can further include instructions to track a plurality of actions associated with one or more tools used to complete one or more workflows; and update each worker's profile and particular worker skill proficiency information based on the worker's tracked actions associated with one or more tools used to complete one or more workflows.

Figure 5:
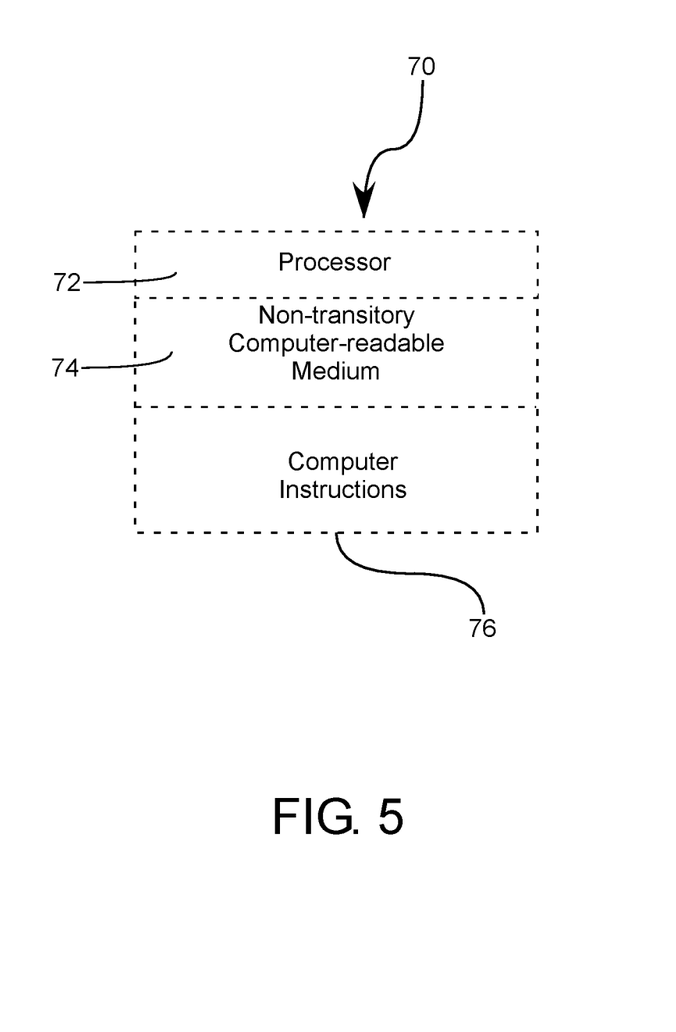
FIG. 5 illustrates an exemplary schematic of a personal worker computer.

In some such embodiments, the system can be configured to track these actions remotely, however, in most cases a particular worker can then be provided with a personal computer or work center 70 which can include a local processor 72, a local non-transitory computer-readable medium 74, and associated computer instructions 76 instructing the processor 72 to utilize system input mechanisms to track user actions and transmit these actions back for recording in the worker competency database associated with the worker's profile information. In some such cases, these actions can include tool usage, tool feature usage, as detected through worker input while working on various current or previous projects, actions utilized while taking assessments or performing various tasks in training modules.

It will be understood that various keystrokes, hotkey usage, cursor movements, sensor input data, etc. can be associated with various skills, sequences, motions, etc. which can then be correlated to particular proficiencies with using those tool features. For example, a proficiency detection sensor 80, can be provided either locally or remotely to detect such input. Sensor 80 can include one or more optical (visible and IR), sound, other electromagnetic detection, weight distribution, temperature, velocity, accelerometer, gyroscopes, switches, GPS and other location-based components types of sensors or input detection components and systems. If the user can be tracked using a sensor with regards to performing a certain task using one or more tools then a baseline can be created and proficiency determined.

In some embodiments the processor 72 can also be configured to determine which tools are being utilized, which can be performed by determining which applications or computer programs are running on a given computer 70, or in some sensor data input situations, tool recognition can be performed using image recognition functions.

In yet additional embodiments the databases can include one or more proficiency assessment databases 58, wherein the proficiency assessment database 58 contains proficiency assessments, the proficiency assessments relating to the tracked worker skill proficiencies associated with one or more particular worker proficiencies. The system 10 can then include computer instructions which direct the one or more processors to present one of the proficiency assessments to at least one worker; track performance data for the worker on the proficiency assessment; and update each worker's profile and particular worker skill proficiency information based on the associated worker's performance on the proficiency assessment.

In some such embodiments a previous workflow can be generated representing an optimal sequence or method for completing one or more tasks in an assessment. In such cases the ultimate proficiency score on such an assessment can be adjusted based on whether a worker achieved a correct answer, how long the worker required to complete the assessment, and deviations from an optimal or most efficient path to completion. The ultimate proficiency score on a given assessment can then have a corresponding effect on a level of competency of a given worker for an associated set of particular competencies covered by the particular assessment.

In yet additional embodiments the non-transitory computer-readable media 50 can include a training module database 60, wherein the training module database 60 contains training information relating to the tracked worker skill proficiencies associated with one or more particular worker proficiencies. The processor can then be instructed to present one of the training modules to at least one worker; track completion of each training module; and update each worker's profile and particular worker skill proficiency information based on the completion of each training module.

In yet additional embodiments the historical databases 56 can include a historical actions workflow database, wherein the historical actions workflow database contains historical actions taken by one or more workers to complete one or more workflows, i.e. past projects, trainings, etc. In some such embodiments the historical actions can then be tracked and related back to or allow for adjustment of the particular worker's tracked worker skill proficiencies associated with one or more particular worker proficiencies. As such, the one or more processors can then analyze the historical actions taken by each worker; and update each worker's profile and particular worker skill proficiency information based on the analyzed historical actions.

In yet additional embodiments the computer instructions can further include instructions to generate a match score between a plurality of worker profiles and associated tracked worker skill proficiencies with a particular set of necessary competencies for project completion of a particular project; and display a listing of ranked matched worker profiles based on the match score. In some such embodiments, the match score can be generated giving a first greater weight to analyzed historical actions regarding one or more previously completed workflows, a second lesser weight to performance assessments, and a third lesser weight to completed training modules.

In yet additional embodiments the computer instructions can further include instructions to access or store a published works database 90, wherein the published works database contains information relating to one or more published works generated by one or more particular workers, wherein the one or more published works are associated with one or more tracked worker skill proficiencies. The one or more processors can then be configured to track generation of one or more published works by one or more workers and update each worker's profile and particular worker skill proficiency information based on the generation of published works. In some such embodiments, the probability match of each worker can be affected by the published works from a plurality of categories, which can include peer reviewed third-party publications; non-reviewed third-party publications; and self-publications. It will be appreciated that publications can have differing levels of authority based on the level of scrutiny required. That peer reviewed publications might establish one as an authority on a topic. Meanwhile, some journals, while not peer reviewed might give more authority than others, and ultimately self-published means, like websites or blogs, might be accurate, but ultimately have less authoritative weight. In some instances, the system may also be configured to track public reception by other workers or experts and adjust the ultimate weight of publications on the competency information according to such positive or negative peer treatment.

Another way of expressing the above is a database can contain automatically tracked information with regards to training that a worker has completed, assessments a worker has taken, previous projects or workflows a worker has performed relative to a given tool, utilizing a set of features of that tool related to a particular task. Additionally, the database can contain information regarding publications a worker has created, which can also be automatically tracked or manually input. Each of these sets of information can be weighted to determine an overall assessment when determining a match, score or recommendation for a given project.

It will be further appreciated that the various embodiments, tasks, and features of the system are discussed for purposes of exemplary discussion wherein each of which can also be carried out manually as a method implementation. Further, any particular steps or tasks can also be combined with any other steps or tasks discussed herein as deemed appropriate.

It will be understood that each of the plurality of worker profiles contained within the worker skill database can vary between each worker, wherein each worker has an associated worker skill proficiency for a plurality of features for various tools, i.e. software types, brands, functions within that software, etc. In some instances, each worker profile can be manually input by each worker upon profile creation, and then be updated periodically manually. However, it is of particular advantage to update the worker skill database on a continual and iterative basis using processing circuitry and activity tracking. It will be appreciated that in some instances, a software program, such as an add-on, or a background module provided in the one or more programs, or on the worker's particular computer 70, can be utilized to track worker behavior and the worker skill database can then be automatically modified based on worker behavior. For example, a design program can be provided with an add-on which tracks functions, features, commands, keystrokes, hotkeys used, or any other potential parameter within a program. For purposes of illustration, if a particular worker regularly uses a strength analysis function in a design program, the use of that function can be tracked, and through repeated use it can then be assumed that the particular worker is proficient in using that particular command or function. As such, the use of that command or function can then be recognized by the program, add-on, and reported for inclusion in the worker skill database and associated with the particular worker's skillset.

It will be appreciated that a weighted or probabilistic match score can be provided with respect to a plurality of workers. For example, a first worker might have a demonstrated and tracked proficiency in 90% of the required competencies, while a second worker might have a demonstrated and tracked proficiency in 85% of the required competencies, however, the first worker has more pre-existing project assignments in their queue, so the ultimate assignment of the project is made to the second worker because the second worker will still be able to do a high-quality job on the project, but while the particular turn-around time might be longer on the particular project, the ultimate turnaround time might be less due to the number of projects in their respective queues.

It will also be appreciated that various software programs offer various tutorials and trainings which can aid worker's in becoming proficient at certain commands or competencies without the need to repetitively use a particular skill. As such, in some embodiments, the system can also be configured to recognize and track one or more pre-existing trainings associated with at particular tool which was accessed, presented to, or received by a particular worker and update the worker skill proficiencies associated with an associated particular worker. Such trainings can particularly include query commands by workers regarding how to use particular functions within a program. As such, the fact that a worker has made a query, and perhaps performed a particular task related to the query or training can then be updated within the worker skill database.

It will also be appreciated that various worker's may have previously worked on alternative projects which required use of a particular software program and various functions within that program. As such, the system can track one or more previously completed projects associated with one or more workers and the associated particular project competencies required to complete the previously completed project. The particular required skillsets or competencies for the previous project can then be assumed to have been used, and ultimately mastered to a certain degree, by the worker, and the skill proficiencies associated with an associated particular worker can then be updated in the worker proficiency database.

Figure 1:
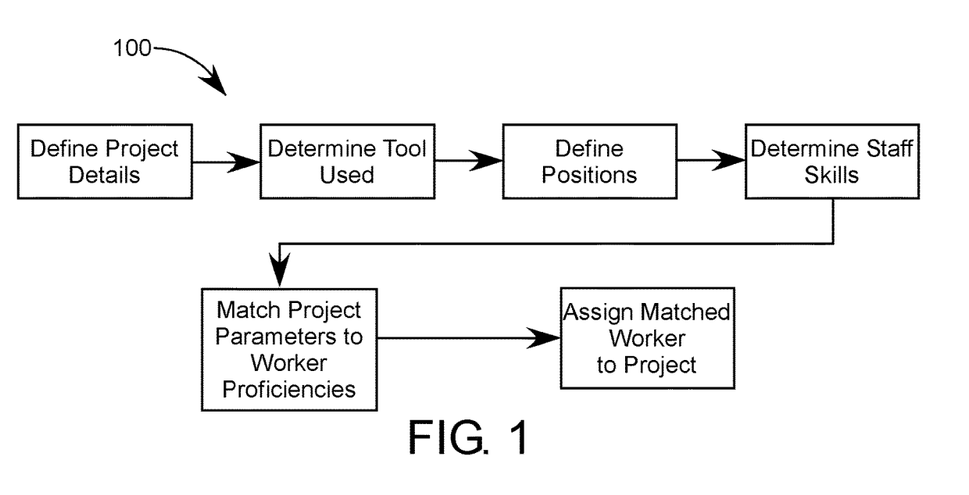
FIG. 1 illustrates a flow chart of various method steps for providing optimized matching between projects and individuals having applicable competencies matching a particular project with a particular staff or user illustrative of various aspects of the present invention.
Figure 2:
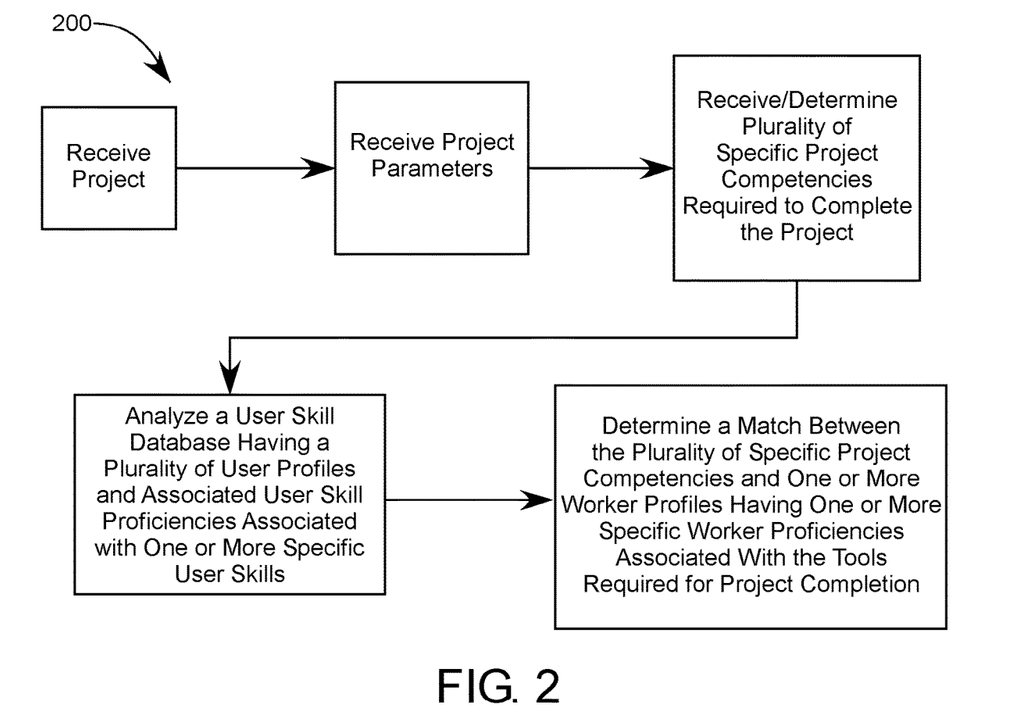
FIG. 2 illustrates an alternative flow chart of various additional method steps for providing optimized matching between projects and individuals having applicable competencies matching a particular project with a particular staff or user illustrative of various aspects of the present invention.
Figure 3:
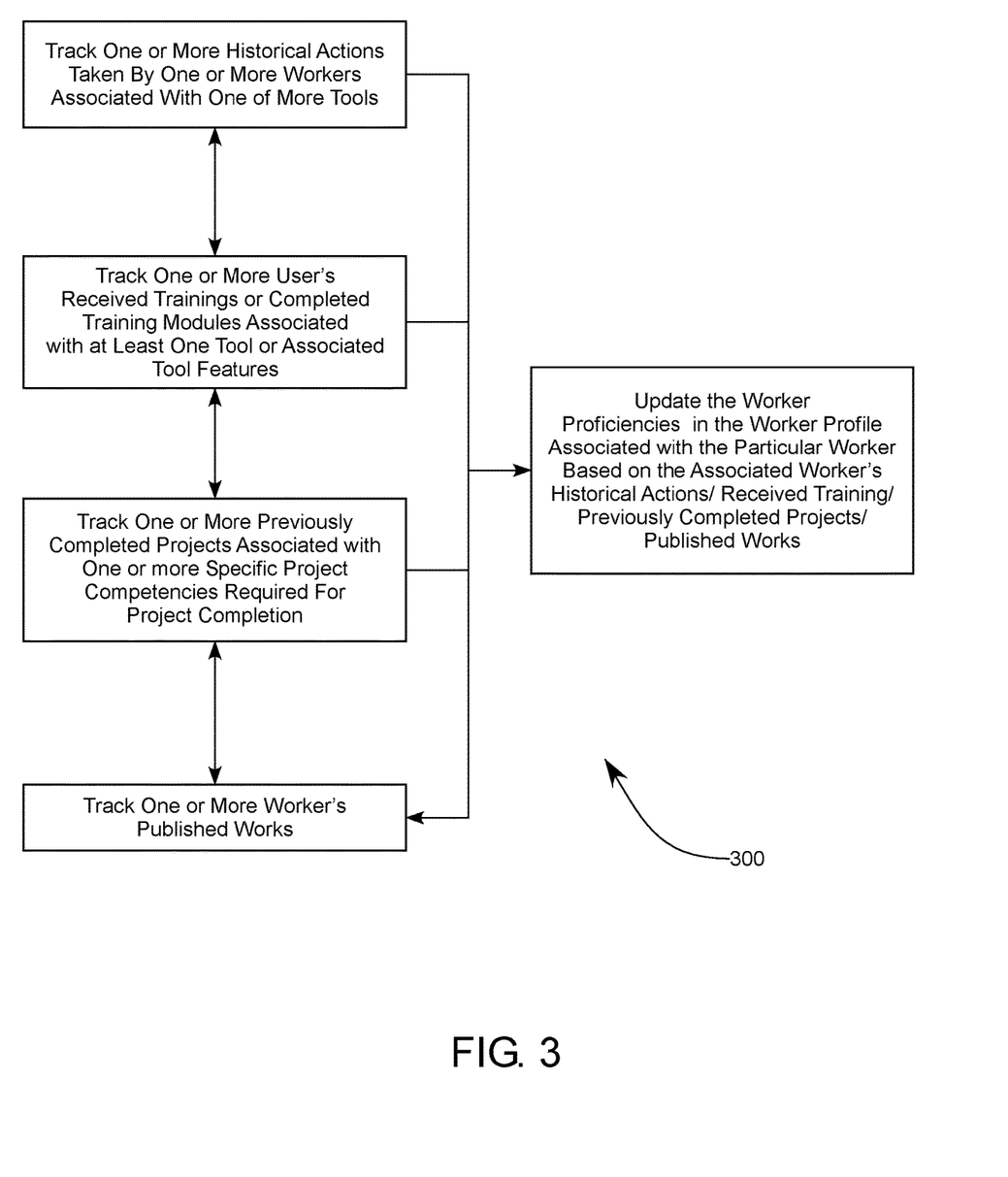
FIG. 3 illustrates yet another alternative flow chart of various method steps for providing optimized matching between projects and individuals having applicable competencies matching a particular project with a particular staff or user illustrative of various aspects of the present invention.

It will be understood, that while some of the steps are discussed in context with respect to the system and implementations thereof, a standalone method, as illustrated in-part by flowcharts 100, 200, and 300 in FIGS. 1-3, for recommending an optimal match between projects and workers is contemplated herein. This method can include the steps of receiving a user input regarding one or more project parameters, the one or more project parameters including information regarding one or more necessary competencies for project completion. Upon receipt of the project parameters, the method can then include a step of analyzing a worker profile database having a plurality of worker profiles, wherein each profile contains information regarding tracked worker proficiencies associated with one or more particular worker proficiencies. The method then includes a step of determining a probability match between the plurality of necessary competencies for project completion and one or more worker profiles having tracked worker proficiencies associated with the plurality of necessary competencies for project completion.

In some embodiments the method can include a step of receiving information regarding one or more tools, i.e. which tools are available, what features will be required to utilize the tool to complete the project, etc.

In some embodiments the method can further include the steps of: tracking one or more assessments of each tool for each worker and updating each worker's profile and particular worker proficiency information based on the worker's tracked assessments with each tool.

In some embodiments the method can further include the steps of: tracking a worker's training history data associated with each tool; and updating each worker's profile and particular worker proficiency information based on the worker's tracked training history data associated with each tool.

In some embodiments the method can further include the steps of: tracking a plurality of actions associated with one or more tools used to complete one or more workflows; and updating each worker's profile and particular worker proficiency information based on the worker's tracked actions associated with one or more tools used to complete one or more workflows.

In some embodiments the method can further include the steps of: providing a proficiency assessment database, wherein the proficiency assessment database contains proficiency assessments, the proficiency assessments relating to the tracked worker proficiencies associated with one or more particular worker proficiencies; presenting one of the proficiency assessments to at least one worker; tracking performance data for the worker on the proficiency assessment; and updating each worker's profile and particular worker proficiency information based on the associated worker's performance on the proficiency assessment.

In some embodiments the method can further include the steps of: providing a training module database, wherein the training module database contains training information relating to the tracked worker proficiencies associated with one or more particular worker proficiencies; presenting one of the training modules to at least one worker; tracking completion of each training module; and updating each worker's profile and particular worker proficiency information based on the completion of each training module.

In some embodiments the method can further include the steps of: providing a historical actions workflow database, wherein the historical actions workflow database contains historical actions taken by one or more workers to complete one or more workflows, the historical actions relating to the tracked worker proficiencies associated with one or more particular worker proficiencies; analyzing the historical actions taken by each worker; and updating each worker's profile and particular worker proficiency information based on the analyzed historical actions.

In some embodiments the method can further include the steps of: generating a match score between a plurality of worker profiles and associated tracked worker proficiencies with a particular set of necessary competencies for project completion of a particular project; displaying a listing of ranked matched worker profiles based on the match score.

In some embodiments the method can further include the steps of: generating a match score between a plurality of worker profiles and associated tracked worker proficiencies with a particular set of necessary competencies for project completion of a particular project; and displaying a listing of ranked matched worker profiles based on the match score. In some such embodiments, the match score can be generated giving a first greater weight to analyzed historical actions regarding one or more previously completed workflows, a second lesser weight to performance assessments, and a third lesser weight to completed training modules.

In some embodiments the method can further include the steps of: providing a published works database, wherein the published works database contains information relating to one or more published works generated by one or more particular workers, wherein the one or more published works are associated with one or more tracked worker proficiencies; tracking generation of one or more published works by one or more workers; and updating each worker's profile and particular worker proficiency information based on the generation of published works. In some such embodiments the probability match of each worker can be affected by the published works from a plurality of categories, the plurality of categories including: peer reviewed third-party publications, non-reviewed third-party publications, and self-publications.

It is noted that no specific order is required in the aforementioned methods, though generally these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

In yet additional embodiments a worker can provide a written project description and the processor can analyze the written description and match keywords with one or more trackable worker proficiencies within the worker proficiency database. The processor can then automatically populate at least a portion of list of required competencies for the particular project.

In some instances, the user can be prompted to provide supplemental input regarding required competencies. In some such embodiments, the user providing the project details can be asked a plurality of queries relating to particular details about the new project which relate to various competencies tracked within the worker proficiency database. In some such instances, the queries can be provided in one or more chains arranged into specific hierarchies. For example, "does this project require drafting?", "does the customer prefer a specific file format?", "does the project require strength analysis?", "does the project require load/fatigue analysis?", wherein each question can automatically narrow the search field within the worker proficiency database for potential worker proficiency matches based on the project receiving user's input.

In yet additional embodiments input can be received regarding competency importance for each required competency for the new project. The competency requirements can then be given a weighted requirement score. Accordingly, the relative competency proficiency or strength for each worker and each associated competency can also be adjusted and weighted with regard to their associated proficiency with regard to that competency. Further, the processor can then determine a weighted match between the project and a particular worker based on relative competency importance weight, and relative competency strength or proficiency in the various competencies.

The following illustrates one exemplary lambda notation of various computer instructions configured to instruct a processor to implement various aspects of the present invention:

```
var totalLessons = (from I in
Context.Lessons
    var totallessons = (from I in Context.Lessons
        join pcl in Context.LessonConcepts on I.Id equals
            pcl.LessonId
        join pupc in Context.ProjectUserProductCompetencies
        on
            pcl.ProductConceptId equals
            pupc.CompetencyId
        where projectUserIds.Any(pu =>
            pupc.ProjectUserProduct.Projectuser.Id ==
            pu)
```

```
            select l).Distinct( ).Count( );
    var totalQuestions = (from pc in Context.ProductConcepts
            join pcl in Context.LessonConcepts on pc.Id equals
                pcl.ProductConceptId
            join ql in Context.QuestionLessons on pcl.LessonId equals
                ql.LessonId
            join q in Context.Questions on ql.QuestionId equals q.Id
            join pupc in Context.ProjectUserProductCompetencies on
                pcl.ProductConceptId equals pupc.CompetencyId
            where (q.OwningOrganizationId == null ||
            q.OwningOrganizationId
                == organizationId) && pcl.ProductConceptId == pc.Id
            && projectUserIds.Any(pu =>
                pupc.ProjectUserProduct.ProjectUser.Id == pu)
            select q).Distinct( ).Count( );
        var group = await (from u in Context.Users
            join ou in Context.OrganizationUsers on u.Id equals
                ou.UserId
join lessons in (from luv in Context.LessonUserViews
join lc in Context.LessonConcepts on luv.LessonId equals lc.LessonId
join pupc in Context.ProjectUserProductCompetencies on
lc.ProductConceptId
equals pupc.CompetencyId
join pup in Context.ProjectUserProducts on pupc.ProjectUserProductId
    equals
pup.Id
select new { luv, lc, pupc, pup }).DefaultIfEmpty( ) on u.Id equals
lessons.luv.UserId
join questions in (from ua in Context.UserAssessments
join uaq in Context.UserAssessmentQuestions on ua.Id equals
uaq.UserAssessmentId
join a in Context.Answers on uaq.AnswerId equals a.Id
join ql in Context.QuestionLessons on uaq.QuestionId equals
ql.QuestionId
join aluv in Context.LessonUserViews on ql.LessonId equals
aluv.LessonId
join alc in Context.LessonConcepts on aluv.LessonId equals alc.LessonId
join apupc in Context.ProjectUserProductCompetencies on
lc.ProductConceptId
    equals apupc.CompetencyId
join apup in Context.ProjectUserProducts on apupc.ProjectUserProductId
    equals apup.Id
select new { ua, apupc, apup, ql, alc, a }).DefaultIfEmpty( ) on u.Id equals
    questions.ua.Userid
where
(lessons.lc.ProductConceptId == lessons.pupc.CompetencyId ||
questions.alc.ProductConceptId == questions.apupc.CompetencyId)
    && (projectUserIds.Any(pu => pu == lessons.pup.ProjectUserId) ||
    projectUserIds.Any(pu => pu == questions.apup.ProjectUserId))
    && ou.OrganizationId == organizationId
//group new { User= u, pup.ProjectUserId, Lessons = luv, Questions = ql
} by
    new { pup.ProjectUserId, u } into g
select new{ User= u, ProjectUserId = lessons.pup.ProjectUserId,
ConceptId =
    lessons.pupc.Competency.Id, Concept =
    lessons.pupc.Competency.Name, Lessons = lessons.luv, Question =
    questions.ql.Question, Answer = questions.a, TotalQuestions =
    totalQuestions, TotalLessons = totalLessons }).ToArrayAsync( );
var agroup = group.GroupBy(g => new { g.Concept, g.ConceptId,
    g.ProjectUserId, g.User });
var bgroup = agroup.GroupBy(u => new { u.Key.ProjectUserId,
u.Key.User });
var results = bgroup.GroupBy(b => b.Key.ProjectUserId).Select(r => new
    ProjectUserRankDto
        {
ProjectUserId = r.Key,
MatchingUsers = (from u in r
let Concepts = (from c in u
let CorrectQuestions = c.Select(a => a.Answer).Distinct( ).Count(a =>
    a.PercentCredit > 0)
let TotalQuestions = c.Select(q => q.TotalQuestions).Max( )
let IncorrectQuestions = c.Select(a => a.Answer).Distinct( ).Count(a =>
    a.PercentCredit == 0)
let LessonViews = c.Select(l => l.Lessons).Distinct( ).Count( )
let TotalLessons = c.Select(l => l.TotalLessons).Max( )
let LessonRank = TotalLessons == 0 ? 0f : (float)LessonViews /
    (float)TotalLessons
let QuestionRank = TotalQuestions == 0 ? 0f : (float)(CorrectQuestions −
    IncorrectQuestions) / (float)TotalQuestions
select new ProjectUserConceptMatchDto
    {
Concept = c.Key.Concept,
ConceptId = c.Key.ConceptId,
CorrectQuestions = CorrectQuestions,
TotalQuestions = TotalQuestions,
IncorrectQuestions = IncorrectQuestions,
LessonViews = LessonViews,
TotalLessons = TotalLessons,
    Score = QuestionRank > LessonRank ? QuestionRank :
        ((float)((CorrectQuestions − IncorrectQuestions) * 1.2 +
        LessonViews) /
        (float)(TotalQuestions + TotalLessons))
                        }).OrderByDescending(o => o.Score)
select new ProjectUserMatchDto
    {
        Score = Concepts.Count( ) == 0 ? 0 : ((Concepts.Sum(s =>
(float?)s.Score) ?? 0f) / (float)Concepts.Count( )) * 100.0f,
        Userid = u.Key.User.Id,
        Username = u.Key.User.Name,
        Concepts = Concepts
}).OrderByDescending(o => o.Score)
                        });
    return results.Where(u => projectUserIds.Any(p => p ==
u.ProjectUserId));
```

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A project analysis and recommendation system:
a user interface configured to receive user input regarding one or more project parameters, the one or more project parameters including information regarding one or more necessary competencies for project completion;
a non-transitory computer-readable medium containing one or more sets of computer instructions; and
one or more processors configured to implement the one or more sets of computer instructions from the non-transitory computer-readable medium, the computer instructions containing instructions for the one or more processors to perform the following tasks:
automatically track a plurality of workers' interactions with each tool used in one or more workflows, and wherein the interactions include keystrokes and cursor movements;
update each worker's profile and particular worker skill proficiency information into a worker profile database based on the worker's tracked interactions associated with each tool used to complete the one or more workflows as compared to an optimal method of completing the one or more workflows;
automatically track a plurality of workers' training history data;
update each worker's profile and particular worker skill proficiency into the worker profile database based on the workers' tracked training history data;
analyze the worker profile database and generate a match score based on the one or more necessary competencies of the one or more project parameters and the plurality of worker profiles and particular skill proficiencies associated therewith, and wherein the match score weights worker skill proficiency information based on completed workflows higher than worker skill proficiency information associated with training history data; and
display a listing of ranked matched worker profiles based on the match score.

2. The system of claim 1, wherein the user interface is configured to receive information regarding one or more tools.

3. The system of claim 2, wherein the computer instructions further include instructions to perform the following tasks:
track one or more assessments completed by a plurality of particular workers, each assessment being associated with a particular tool; and
update each particular worker's profile and particular worker proficiency information based on the worker's tracked assessments associated with each tool.

4. The system of claim 1, wherein the computer instructions further include instructions to perform the following tasks:
store a proficiency assessment database, wherein the proficiency assessment database contains proficiency assessments, the proficiency assessments relating to the tracked worker proficiencies associated with one or more particular worker proficiencies;
present one of the proficiency assessments to at least one worker;
track performance data for the worker on the proficiency assessment; and
update each worker's profile and particular worker proficiency information based on the associated worker's performance on the proficiency assessment.

5. The system of claim 4, wherein the match score generated weights the worker skill proficiency information based on proficiency assessments greater than the worker skill proficiency information associated with training history data.

6. The system of claim 1, wherein the computer instructions related to automatically tracking a plurality of workers' training history data further includes:
storing a training module database, wherein the training module database contains training information relating to the tracked worker proficiencies associated with one or more particular worker proficiencies;
presenting one of the training modules to at least one worker;
tracking completion of each training module; and
updating each worker's profile and particular worker proficiency information based on the completion of each training module.

7. The system of claim 1, wherein the computer instructions further include instructions to perform the following tasks:
store a historical actions workflow database, wherein the historical actions workflow database contains historical actions taken by one or more workers to complete one or more workflows, the historical actions relating to the tracked worker proficiencies associated with one or more particular worker proficiencies;
analyze the historical actions taken by each worker; and
update each worker's profile and particular worker proficiency information based on the analyzed historical actions.

8. The system of claim 1, wherein the computer instructions further include instructions to perform the following tasks:
store a published works database, wherein the published works database contains information relating to one or more published works generated by one or more particular workers, wherein the one or more published works are associated with one or more tracked worker proficiencies;
track generation of one or more published works by one or more workers; and
update each worker's profile and particular worker proficiency information based on the generation of published works.

9. The system of claim 8, wherein the match score is further based on published works and the weight associated with the publish works is updated based on tracked public reception of the published works.

10. A project recommendation system:
a non-transitory computer-readable medium containing one or more sets of computer instructions; and
one or more processors configured to implement the one or more sets of computer instructions from the non-transitory computer-readable medium, the computer instructions containing instructions for the one or more processors to perform the following tasks:
receive input regarding one or more project parameters, wherein the one or more project parameters require necessary competencies for project completion;
analyze a worker profile database having a plurality of worker profiles, wherein each profile contains information regarding tracked worker proficiencies derived from automatically tracking a worker's trainings, assessments, and workflow completions and comparing each of the trainings, assessments and workflow completions to an optimal standard based at least in part on keystroke and cursor movement interactions with each of the tools utilized for the trainings, assessments, and workflow completions; and determine a probability match between the plurality of necessary competencies for project completion and each of the plurality of worker profiles having tracked worker proficiencies associated with the necessary competencies for project completion.

\* \* \* \* \*